Patented Feb. 15, 1944

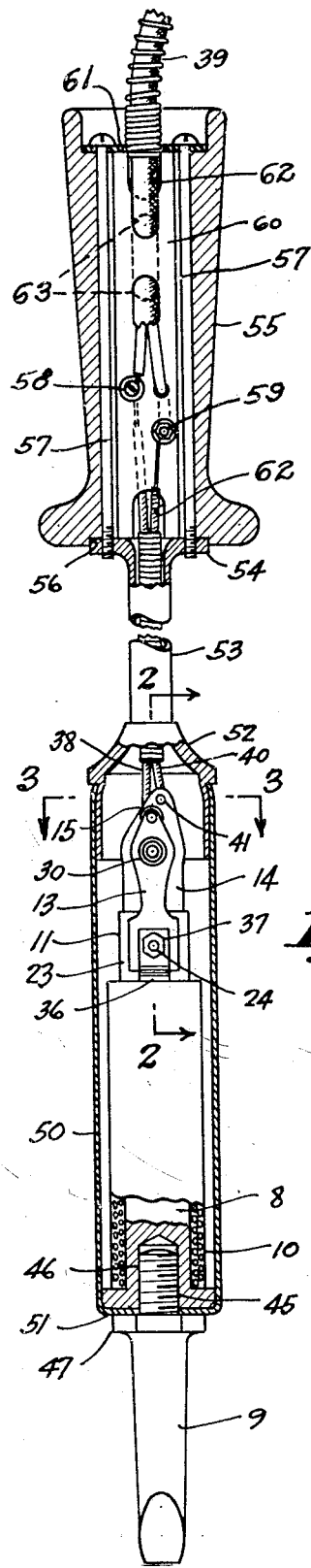
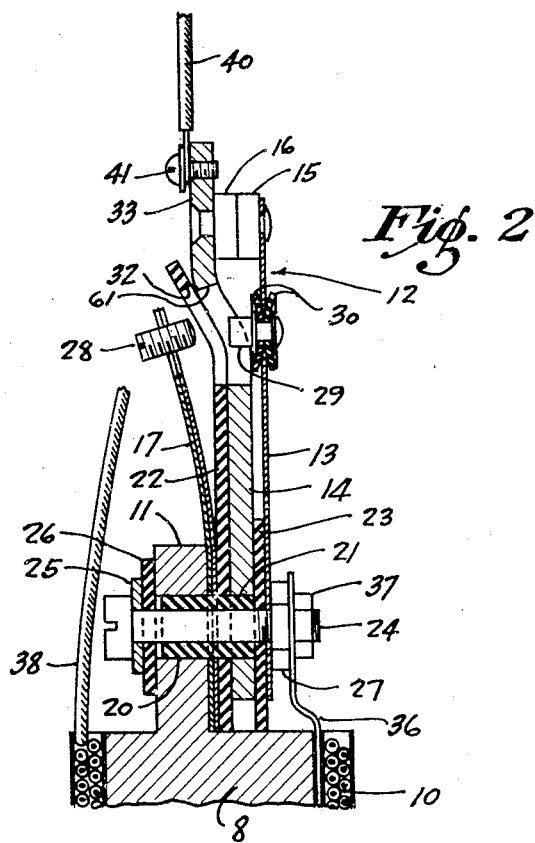
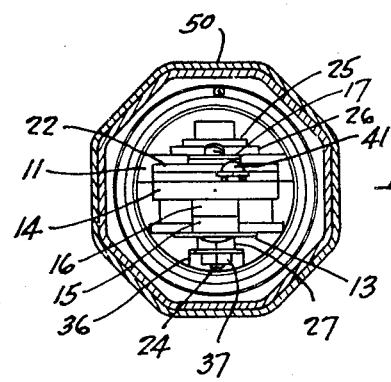

2,341,831

UNITED STATES PATENT OFFICE 2,341,831

SOLDERING IRON

Willis N. Vanatta, Ontario, Calif.; Clara Fay Vanatta administratrix of said Willis N. Vanatta, deceased Application June 6, 1942, Serial No. 446,011

3 Claims. (Cl. 219—25)

This invention relates to an electrically heated soldering iron, and more particularly of the type shown in Patent No. 2,260,647, issued to Willis N. Vanatta on October 28, 1941.

Such irons are so arranged that the heating element, disposed around the copper core, or other material, can very quickly heat the core to the required temperature effective to perform the soldering operation. It is therefore important to control the heating element as by a thermostat so as to interrupt the heating element circuit whenever the temperature reaches a maximum, and to re-establish the circuit when the temperature is lowered to a minimum.

The thermostat is mounted in good heat transfer relationship with respect to the core; for example, this can be done by supporting the thermostat structure on a projection formed on the core.

It is one of the objects of this invention to ensure that the thermostat structure will continue to function properly and will perform its cycles of controlling the heating element, repeatedly to open and close the heating circuit at the same maximum and minimum temperatures respectively. By the aid of this invention, the thermostat contacts open always at substantially the same high temperature and close always at substantially the same low temperatures. There is no marked deterioration of the thermostat even after extended use of the iron.

Due to the cyclic contraction and expansion of the core when subjected to the variations in temperature, the core parts "grow", and furthermore, scale forms on the surfaces. These undesirable features affect the operation of the bimetallic thermostat, and cause erratic control of the heating circuit; and this erratic behavior would often cause the heating element to be burnt out.

It is another object of this invention to obviate this erratic operation.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is an elevation, partly in section, of a soldering iron incorporating the invention;

Fig. 2 is a vertical transverse section on an enlarged scale, taken along plane 2—2 of Fig. 1; and Fig. 3 is a cross section on an enlarged scale, taken along plane 3—3 of Fig. 1.

The soldering iron includes the core 8, provided with a detachable tip 9 and the heating unit 10. This heating unit or element may be in the form of a coil disposed around the core 8. The conductor forming the coil 10 is of appropriate resistance material such as nichrome, and insulated so as to withstand the temperatures attained at the core 8. This heating coil 10 is of relatively large capacity, so as to make it possible to heat the iron quite rapidly.

The core 8 has an extension 11, shown in this instance as formed integrally with the core. This extension 11 serves as a supporting means for a thermostatically operated circuit controlling device 12 for coil 10. The extension 11, as shown most clearly in Figs. 2 and 3 is placed slightly off center with respect to the core 8, in order better to adapt it to support the elements of the circuit controller or switch 12.

The switch 12 includes the arms 13 and 14, respectively carrying cooperating contacts 15 and 16. In the present instance contact arm 13 is formed as a flat strip of spring material so as to render it resilient. The other arm 14 is formed of rigid material. The contacts 15 and 16 are urged into engagement by the resilience of arm 13, operating against the rigidity of arm 14. Engagement of the contact buttons 15 and 16 causes energization of the coil 10, if the soldering iron be connected to an appropriate outlet.

Upon attainment of a definite high temperature by the core 8, the contact points 15 and 16 are caused to separate. This is accomplished for example by a bimetallic member 17, which flexes toward the right as viewed in Fig. 2 in response to an increase in temperature. In Fig. 2, the bimetallic member 17 is shown in the position it assumes when the soldering iron is cool.

The bimetallic member 17 and the arm 13 are disposed adjacent respectively opposite sides of the rigid arm 14 and are properly insulated therefrom in a manner to be hereinafter described.

When member 17 flexes toward the right, as viewed in Fig. 2, in response to a rise in temperature, it operates the resilient arm 13, urging it toward the right and separating contacts 15 and 16. For this purpose, member 17 is provided with an adjustable abutment 28. The abutment is in the form of a headless screw engaging a threaded aperture in the member 17. It may be adjusted to open the contacts 15 and 16 at a predetermined high temperature, by threading it in or out of the threaded aperture. The end of the member 17 is slotted across the threaded aperture; the halves of the member 17, thus formed by the slot, may be pinched toward each other to clamp the screw 28 resiliently. In this way, a resilient lock for the headless screw 28 is provided, so that adjustment of the screw may be maintained securely against accidental disturbance.

The end of screw 28 is arranged, upon predetermined flexure of member 17, to engage a suitable pad 29 supported on arm 13. This pad may conveniently consist of a small rivet passing through the arm and insulated from it by insulating washers 30.

The switch 12, comprising arms 13 and 14, and the bimetallic member 17, with their associated parts, is mounted on one side of the extension 11. The assembly is so arranged that the bimetallic member 17 is in direct heat transfer relation to the extension 11; and the elements 13, 14 and 17 are spaced quite closely together.

Thus the rigid arm 14 is insulated from the spring arm 13 by the aid of insulation 23, such as mica, interposed between the lower ends of these arms; similarly insulation material 22, such as mica, is interposed between arm 14 and the member 17. The insulation 22 is substantially coextensive with the bimetallic element 17, thereby effectively preventing it from coming into contact with the arm 14. Apertures 32 and 61 are provided near the upper ends of arm 14 and the upper end of insulation material 22 to leave a clear passage for abutment 28 in its movement toward the pad 29. The extent of flexure of member 17 to open the contacts 15 and 16 is affected by the spacing of the lower ends of member 17 and arm 13. This spacing is represented by the thickness of insulation materials 23 and 24, as well as by the thickness of arm 14. There is thus no liability of any material disturbance in this spacing during continued cycles of operation. Nor is there at any time any material force tending to disturb the regularity of the cycles of flexure of the member 17. Accordingly the switch 12 can be relied upon to operate at the required limiting temperatures. The coil 10 is assured against being burned out.

In order to hold the parts in assembled relation on one side of extension 11, use is made of a screw or bolt 24. This bolt passes through the aperture 20, lined with an insulating bushing 21. This insulating bushing extends toward the right of the projection 11, as viewed in Fig. 2. It passes through appropriate apertures in the bimetallic member 17, insulation 22, and arm 14, and abuts against the insulation material 23, which may also be of mica.

In order to insulate projection 11 completely, an insulation washer 26 of mica or the like is disposed on the left hand side of the projection 11. A metal washer 25 may be disposed between the insulation washer 26 and the head of bolt 24.

A nut 27 is threaded over the right hand end of the bolt 24 to hold the parts in the assembly relation shown in Fig. 2.

All of the insulated members described are capable of withstanding the high temperatures encountered during operation of the soldering iron.

The terminals for coil 10 may be appropriately connected to the switch 12 and to the source of supply; for example, one terminal 36 (Fig. 2) is connected to contact arm 13, as by being clamped against nut 27 on screw 24 by another nut 37. The other terminal 38 passes into the handle structure and is there connected to one conductor of the supply cord 39. The other conductor of the supply cord is connected by lead 40 attached to the projection 33 of arm 14, by a screw 41. The complete circuit for the coil thus extends through lead 38, coil 10, lead 36, nut 27, screw 24, arm 13, contacts 15 and 16, arm 14, projection 33, and lead 40.

Due to the intimate thermal contact between bimetallic member 17 and extension 11 this bimetallic metal 17 responds promptly to temperature variations of core 8. As the core temperature increases the member 17 flexes toward the right. Upon attainment of a definite high temperature the abutment 28 urges pad 29 toward the right to flex arm 13 out of contacting relationship. When the iron cools sufficiently the member 17 flexes toward the left, and after a time the circuit is re-established by withdrawal of the abutment 28 from the pad 29.

The tip 9 (Fig. 1) is detachably secured to the bottom of core 8 by a threaded extension 45. This extension engages a correspondingly threaded opening 46 in core 8. It is the intention to have tips of different sizes and configurations to suit the character of the work. A hexagonal flange 47 may be provided for the tip 9 to facilitate removal and replacement in the core 8.

Coil 10 and switch 12 are enclosed in a metal tube or sheath 50. This sheath may have an inwardly directed flange 51 on its lower end through which the threaded portion 45 of the tip 9 may pass. The upper end of the sheath 50 is secured to a cap member 52 which in turn is secured to a small diameter tube 53. This tube 53 carries a flange 54 at its upper end. A wood handle 55 is attached to the flange 54. For this purpose, the flange 54 rests in the counterbore 56 in the bottom of the handle. A pair of long screws 57 serve to attach the handle to the flange 54.

In order to prevent the transmission of any material tension from cord 39 upon the leads for the coil 10, a terminal board 60 of insulation material is provided in the handle. This board 60 is of relatively thin material having a length substantially equal to that of the space in the handle 55, defined by flange 54 and the upper collar 61. It is also provided with slots 62 at its opposite ends. The conductors 38 and 40 are permitted by the lower slot to pass on opposite sides of the board 60, and to terminate at terminals 58 and 59 supported by the board. The twin conductors of cord 39 are respectively attached to these terminals. The board also has a pair of apertures 63 through which cord 39 is threaded. Thus a pull on cord 39 cannot be transmitted beyond the board 60, because of the friction encountered at the edges of these apertures.

What is claimed is:

1. In an electrically heated soldering iron, a core having an extension, an electric heating element surrounding the core, and a thermostatic switch for controlling said circuit, comprising a stationary arm, a contact supported by the arm, a flexible arm, a contact co-operating with the stationary contact and supported by the flexible arm, a bi-metallic member, means insulating said arms from one another and from the core and its extension, means for transmitting motion from the bimetallic member to the flexible arm and electrically insulated from at least one of the arms, and means for attaching the two arms and the bimetallic member to one side of the core projection, and with the bimetallic member in intimate heat exchanging contact with said projection.

2. In an electrically heated soldering iron, a core having an extension, an electric heating element surrounding the core, and a thermostatic switch for controlling said circuit, comprising a first arm, a contact supported by the arm, a second arm made from resilient material, a contact cooperating with the contact supported by the first arm, and supported on said second arm, insulation material between one side of the first arm, and the second arm, a flexible bimetallic member disposed on the other side of said first arm and in intimate contact with said extension, said bimetallic member operating to move said second arm, insulation material between the first arm and the said bimetallic member, and fastening means passing through the arms and the bimetallic member, and engaging said extension.

3. In an electrically heated soldering iron, a core having an extension, an electric heating element surrounding the core, and a thermostatic switch for controlling said circuit, comprising a first arm, a contact supported by the arm, a second arm made from resilient material, a contact cooperating with the contact supported by the first arm, and supported on said second arm, insulation material between one side of the first arm, and the second arm, a flexible bimetallic member disposed on the other side of said first arm and in intimate contact with said extension, said bimetallic member operating to move said second arm, insulation material between the first arm and the said bimetallic member, said first arm and the insulation material between said first arm and the bimetallic member having apertures to permit said bimetallic member to operate said second arm, said contact remaining in engagement during a portion of the flexing of the bimetallic member, and fastening means passing through the arms and the bimetallic member, and engaging said extension.

WILLIS N. VANATTA.